(12) United States Patent
Weingarten

(10) Patent No.: US 7,942,061 B2
(45) Date of Patent: May 17, 2011

(54) PRESSURE DIFFERENTIAL METERING DEVICE

(75) Inventor: Zvi Weingarten, Evron (IL)

(73) Assignee: Bermad CS Ltd., Evron (IL)

( * ) Notice: Subject to any disclaimer, the term of this patent is extended or adjusted under 35 U.S.C. 154(b) by 350 days.

(21) Appl. No.: 12/112,051

(22) Filed: Apr. 30, 2008

(65) Prior Publication Data

US 2009/0272194 A1 Nov. 5, 2009

(51) Int. Cl.
*G01F 1/00* (2006.01)
*G01L 7/00* (2006.01)
(52) U.S. Cl. .......................... 73/700; 73/861
(58) Field of Classification Search .................. None
See application file for complete search history.

(56) References Cited

U.S. PATENT DOCUMENTS

| | | | | |
|---|---|---|---|---|
| 5,201,322 A | * | 4/1993 | Henry et al. | 600/532 |
| 5,789,660 A | * | 8/1998 | Kofoed et al. | 73/23.2 |
| 6,128,963 A | * | 10/2000 | Bromster | 73/861.52 |
| 6,672,173 B2 | * | 1/2004 | Bell | 73/861.52 |
| 6,725,731 B2 | * | 4/2004 | Wiklund et al. | 73/861.52 |
| 6,848,323 B2 | * | 2/2005 | Krouth et al. | 73/861.47 |
| 7,357,040 B2 | * | 4/2008 | Bell | 73/861.63 |

* cited by examiner

*Primary Examiner* — Lisa M Caputo
*Assistant Examiner* — Jermaine Jenkins
(74) *Attorney, Agent, or Firm* — Mark M. Friedman

(57) ABSTRACT

The pressure differential metering device of the present invention is generally deployed as a flow restrictor placed in the valve inlet so it will create a desired differential pressure to signal a pilot valve, for example, that drives the main valve to limit the flow rate through the valve. The pressure differential metering device of the present invention is deployed across the valve inlet port, with its central axis perpendicular to the direction of fluid flow. The flow restriction element of the present invention may be configured in a variety of sizes to create a desired restrictive cross section to the flow, thereby creating the required differential pressure signals for the valve instrumentation and control. The flow restriction element is configured with upstream and downstream apertures that are the openings to passageways to the corresponding upstream and downstream end-ports. The end-ports provide connection arrangements for the control system of the main valve instrumentation.

14 Claims, 6 Drawing Sheets

SECTION D-D

_US 7,942,061 B2_

PRESSURE DIFFERENTIAL METERING DEVICE

FIELD AND BACKGROUND OF THE INVENTION

The present invention relates to fluid flow metering devices and, in particular, it concerns a pressure differential metering device that is deployable in the inlet duct of a fluid flow control valve.

It is known to use orifice plates to either regulate fluid flow through a pipeline or the measure the fluid flow based on the pressure differential created by the orifice plate.

Typical installation of an orifice plate is generally not an easy task in which the orifice plate is attached between two adjacent pipe flanges during the production of the pipeline.

There is therefore a need for a pressure differential metering device that is deployable in the inlet duct of a fluid flow control valve that is preferably deployed in the valve inlet duct prior to production of the pipeline.

SUMMARY OF THE INVENTION

The present invention is a pressure differential metering device that is deployable in the inlet duct of a fluid flow control valve According to the teachings of the present invention there is provided, a pressure differential metering device comprising, a flow restriction element deployed in the inlet port duct of a control valve and within the fluid flow path.

According to a further teaching of the present invention, a central axis of the flow restriction element is perpendicular to a direction of the fluid flow path.

According to a further teaching of the present invention, a circumference of the flow restriction element determines a pressure differential created by the flow restriction element.

According to a further teaching of the present invention, the flow restriction element is held in place by end-port elements that are connected to a wall of the inlet port duct.

According to a further teaching of the present invention, the flow restriction element includes at least an upstream aperture in fluid communication with an upstream end-port and a downstream aperture in fluid communication with an downstream end-port.

There is also provided according to the teachings of the present invention, a pressure differential metering device comprising, a flow restriction element deployed within the fluid flow path of a pipeline, a central axis of the flow restriction element being perpendicular to a direction of the fluid flow path.

According to a further teaching of the present invention, a circumference of the flow restriction element determines a pressure differential created by the flow restriction element.

According to a further teaching of the present invention, the flow restriction element is held in place by end-port elements that are connected to a wall of the pipeline.

According to a further teaching of the present invention, the flow restriction element includes at least an upstream aperture in fluid communication with an upstream end-port and a downstream aperture in fluid communication with an downstream end-port.

There is also provided according to the teachings of the present invention, a method of monitoring a pressure differential within a pipeline, the method comprising, deploying a flow restriction element within the fluid flow path of the pipeline, such that a central axis of the flow restriction element is perpendicular to a direction of the fluid flow path.

According to a further teaching of the present invention, there is also provided determining a pressure differential created by the flow restriction element by a circumference of the flow restriction element.

According to a further teaching of the present invention, there is also provided holding the flow restriction element in place by end-port elements that are connected to a wall of the pipeline.

According to a further teaching of the present invention, there is also provided providing the flow restriction element with at least an upstream aperture in fluid communication with an upstream end-port and a downstream aperture in fluid communication with a downstream end-port.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
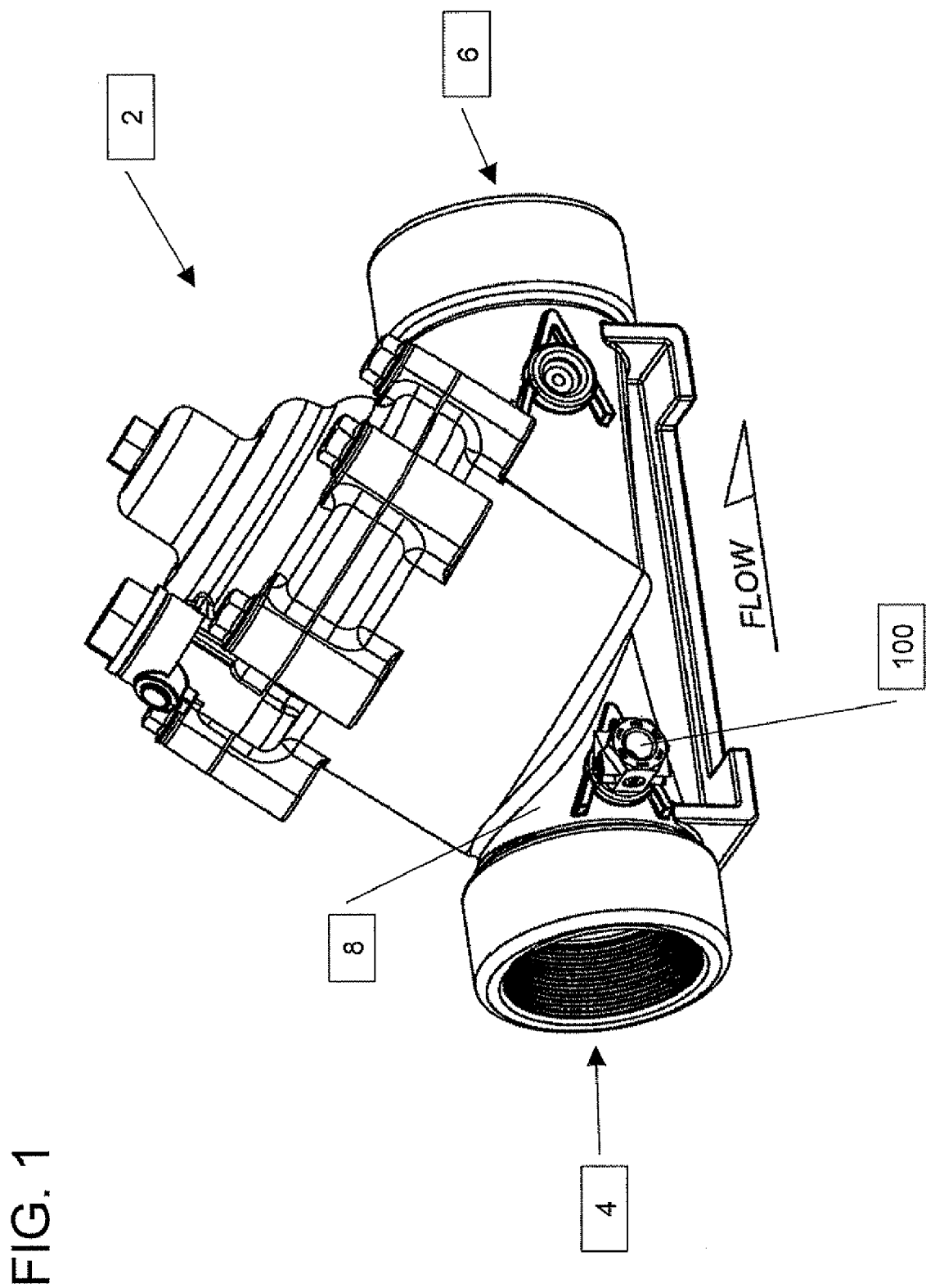
FIG. 1 is an isometric side view of a valve into which a pressure differential metering device constructed and operational according to the teachings of the present invention is installed.
Figure 2:
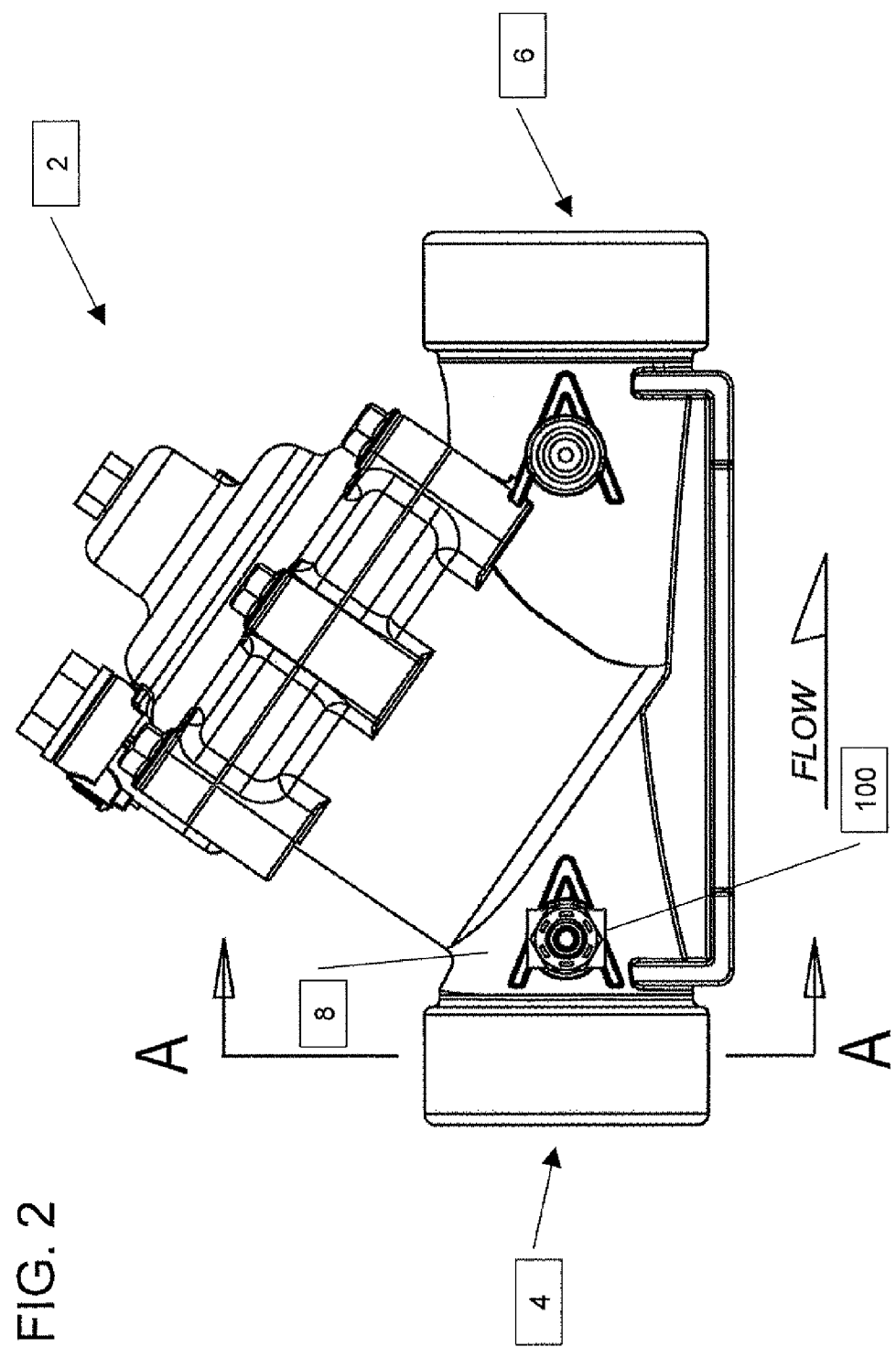
FIG. 2 is a side elevation of the valve of FIG. 1.

The present invention is a pressure differential metering device that is deployable in the inlet duct of a fluid flow control valve.

The principles and operation of pressure differential metering device according to the present invention may be better understood with reference to the drawings and the accompanying description.

By way of introduction, the pressure differential metering device of the present invention is generally deployed as a flow restrictor placed in a valve inlet so it will create a desired differential pressure to signal a pilot valve, for example, that drives the main valve to limit the flow rate through the valve.

According to the present invention, unlike of an orifice plate mounted upstream to a valve as is typical for flow metering duty in the valve industry, the pressure differential metering device of the present invention is placed across the valve inlet port, perpendicular to the direction of fluid flow. The cross-sectional contour of the pressure differential metering device of the present invention may be of substantially any suitable shape and is illustrated herein in having a substantially circular contour by non-limiting example only. It should also be noted that the circumference of contour of the flow restrictor may remain constant along its length, or as illustrated herein, the circumference may vary along the length of the restrictor element. It should also be noted that although both the valve and the pressure differential metering device are illustrated herein in a horizontal orientation, this is only for illustrative purposes and it will be appreciated that the angle of deployment has substantially no influence on the performance of the pressure differential metering device of the present invention. Further, the orientation of deployment of the pressure differential metering device within the pipeline may be varied to meet the design requirement of the valve or length of pipe in which it is deployed.

Similar to the use of an orifice plate in which plates having different orifice diameters are used depending on the required pressure differential, the flow restriction element of the present invention is configured in a variety of sizes to create a desired restrictive cross section to the flow, thereby creating the required differential pressure signals for the valve instrumentation and control. It will be appreciated that the variations may include, by non-limiting example, different cross-sectional shapes and different cross-sectional contour circumferences along all or part of the length of the flow restriction element body.

As will be discussed below in more detail, the flow restriction element is configured with upstream and downstream apertures that are the openings to passageways to the corresponding end-ports. The end-ports provide connection arrangements for the control system of the main valve instrumentation. By non-limiting example, end-ports may be connected to a pilot valve that drives the main hydraulic valve in order to control the fluid flow rate through the valve.

It will be appreciated that for cost effectiveness in mass production, preferably the components of the pressure differential metering device of the present invention are fabricated from materials such as, but not limited to plastics, nylon, and graphite using injection molding techniques. However, the components may be cast, milled or fabricated using substantially any suitable product techniques from substantially any suitable materials.

Referring now to the drawings, FIG. 1 illustrates a valve 2 having an inlet port 4 and an outlet port 6, into which a pressure differential metering device 100 of the present invention is deployed.

Figure 3:
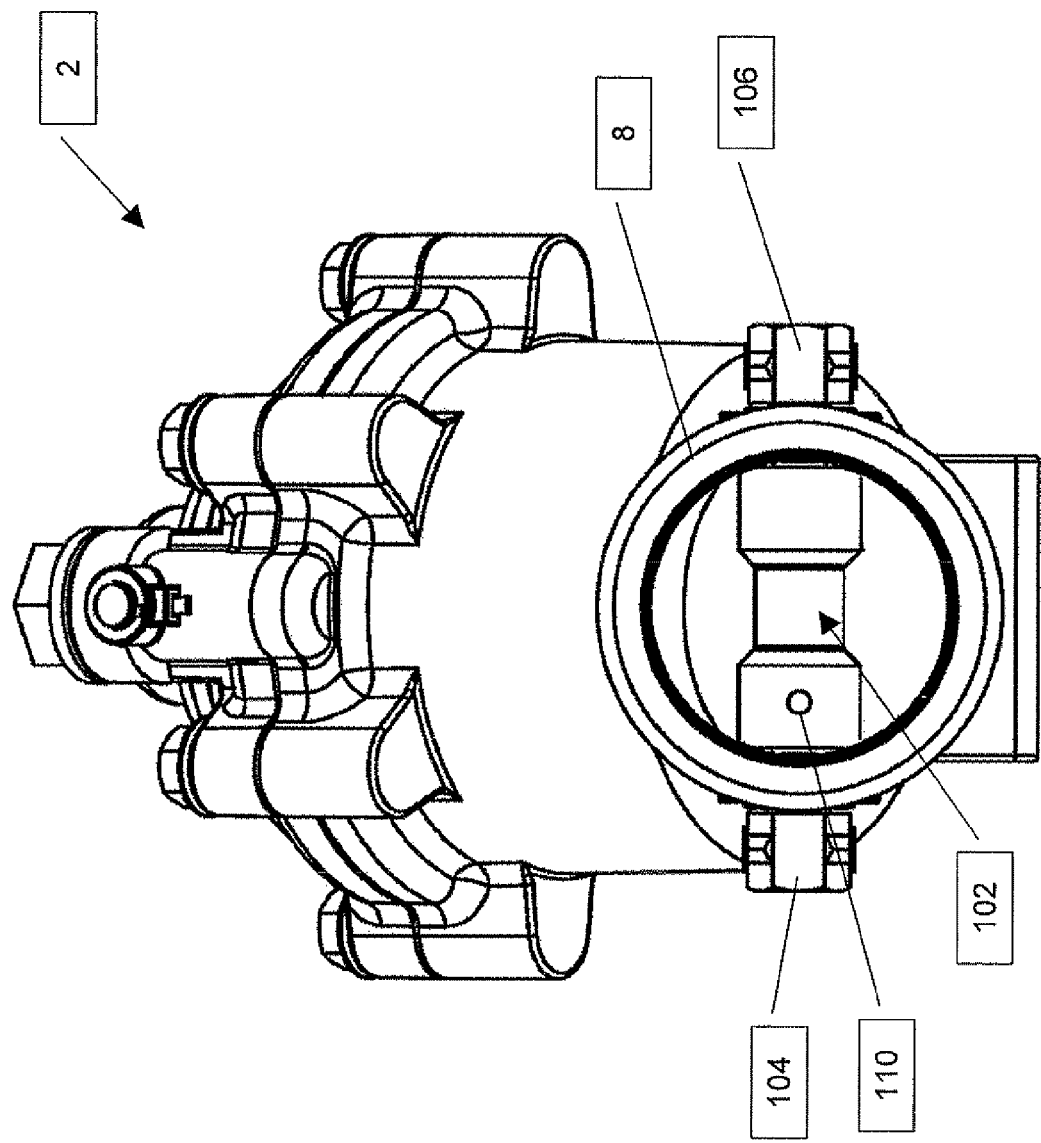
FIG. 3 is an upstream sectional view of the valve of FIG. 1 taken along line A-A of FIG. 2.
Figure 4:
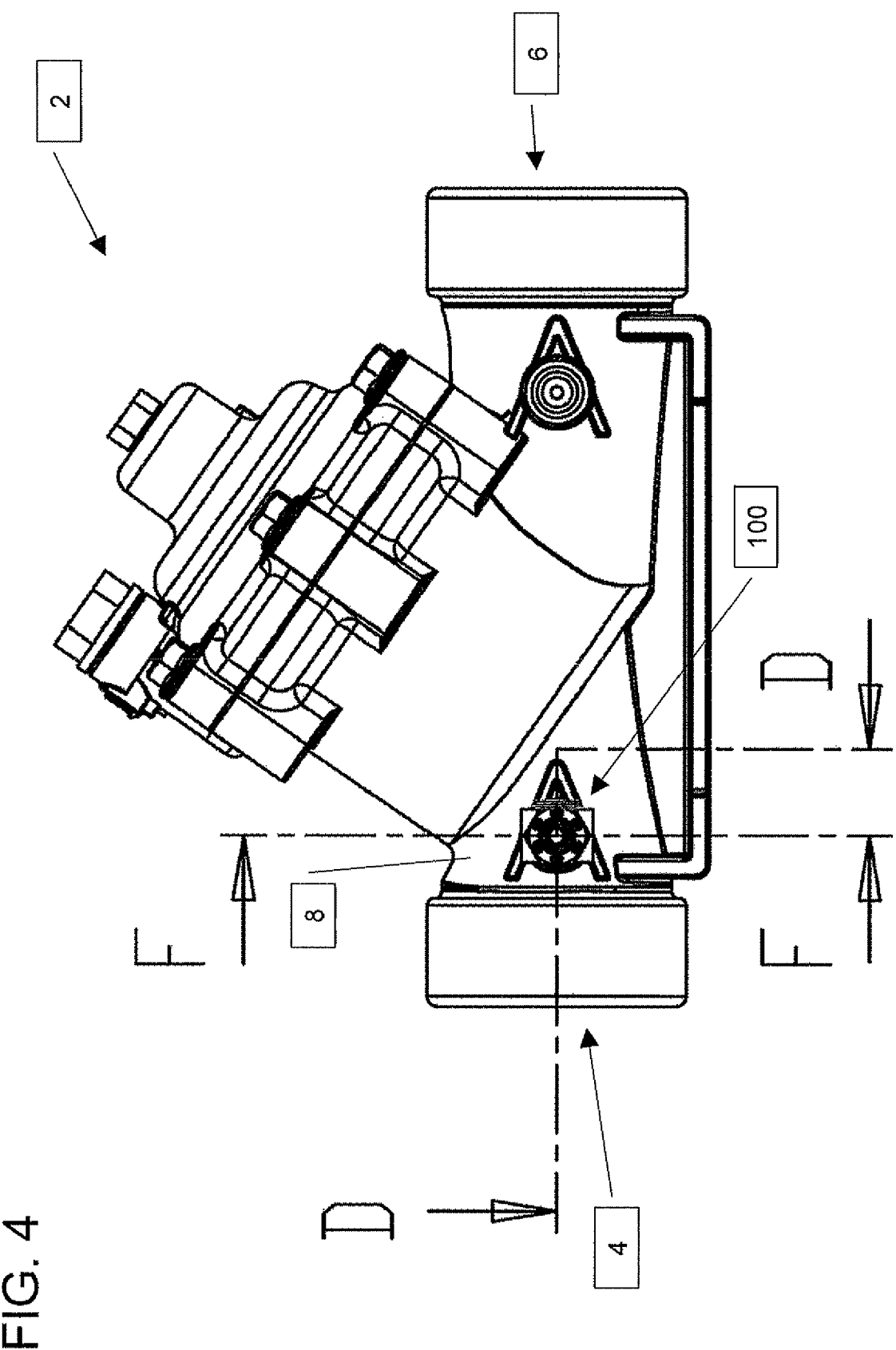
FIG. 4 is a side elevation of the valve of FIG. 1 showing section lines D-D and F-F.
Figure 5:
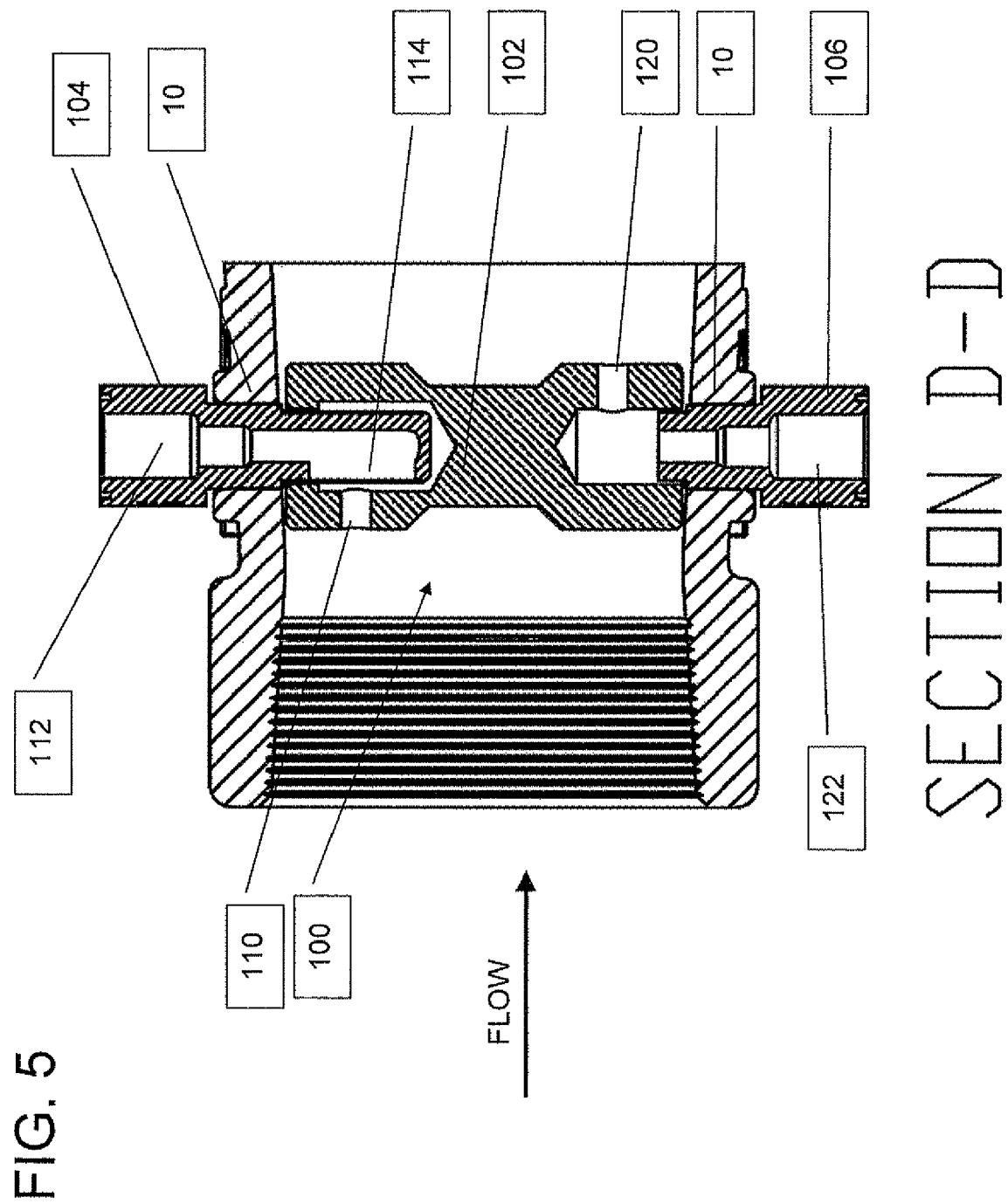
FIG. 5 is a top sectional view of the valve of FIG. 4 taken along line D-D.
Figure 6:
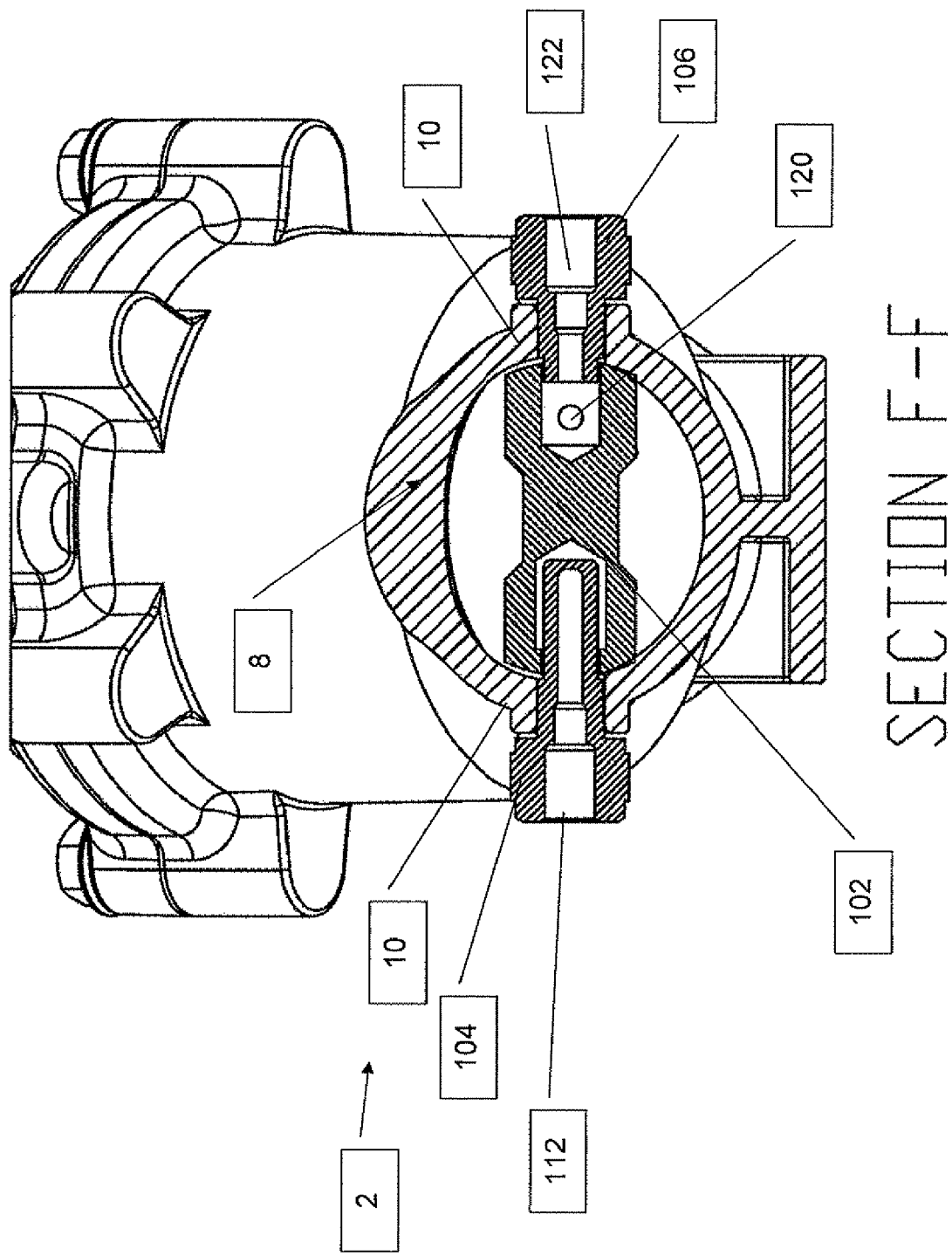
FIG. 6 is an upstream end sectional view of the valve of FIG. 4 taken along line F-F.

The pressure differential metering device 100 is best illustrated in the cross-sectional views of FIGS. 3, 5 and 6, which clearly show the three components of pressure differential metering device 100, the flow restriction element body 102, the upstream end-port element 104 and the downstream end-port element 106. It will be appreciated that the outer ends of the upstream end-port element 104 and the downstream end-port element 106 may be configured for interconnection with any of the variety of connection arrangements known in the art for connecting metering devices to the control system of the main valve instrumentation.

In the non-limiting example illustrated here, the two end-ports are threadedly connected to the wall 8 of the inlet port duct through threaded through-bores 10 and serve to hold the flow restriction element body 102 in place inside the inlet port duct. It will be readily appreciated the initial installation of the pressure differential metering device 100 is quite simple in that the flow restriction element body 102 is inserted into the inlet port duct and the two end-port elements 104 and 106 are screwed into the appropriate threaded through-bores 10 in the wall 8 of the inlet port duct. Likewise, changing the flow restriction element body 102 if necessary requires simply unscrewing the two end-port elements 104 and 106, removing the flow restriction element body 102, inserting the new flow restriction element body 102 and screwing the two end-port elements 104 and 106 back into the threaded through-bores 10 in wall 8 of the inlet port duct.

As best seen in FIG. 5, the flow restriction element body 102 is configured with an upstream aperture 110 and a downstream aperture 120. Upstream aperture 110 is the beginning of passageway 112 that is passes through the upstream end-port element 104. Likewise, downstream aperture 120 is the beginning of passageway 122 that is passes through the downstream end-port element 106.

It should be noted that upstream end-port element 104 may include a screen element as is illustrated by the non-limiting example of screen element 114.

In operation, a pressure differential is created by fluid flow passing the flow restriction element body 102. The upstream pressure is transited to the control system of the main valve instrumentation via the upstream aperture 110 through passageway 112 to the upstream end-port. The downstream pressure is transited to the control system of the main valve instrumentation via the upstream aperture 120 through passageway 122 to the downstream end-port. The control system of the main valve instrumentation then acts on that information in a manner common in the art.

It should be noted that the pressure differential metering device of the present invention may be used to benefit when deployed within a fluid flow pipeline at substantially any location where fluid flow metering is required or is beneficial. Therefore, embodiments of the pressure differential metering device of the present invention configured for and deployed in location in a pipeline other than the inlet port duct of a flow control valve as illustrated herein, are within the scope of the present invention.

It will be appreciated that the above descriptions are intended only to serve as examples and that many other embodiments are possible within the spirit and the scope of the present invention.

What is claimed is:

1. A pressure differential metering device comprising, a flow restriction element deployed in the inlet port duct of a control valve and within a fluid flow path such that a central axis of said flow restriction element is perpendicular to a direction of said fluid flow path, said flow restriction element having a restrictive cross sectional configuration wherein a contour of said restrictive cross sectional configuration of said flow restriction element is a closed curve having a single wall that circumscribes said flow restriction element and said contour determines a pressure differential created by said flow restriction element.

2. The pressure differential metering device of claim 1, wherein said flow restriction element is a variety of said flow restriction elements in a variety of sizes and shapes such that at lest one said flow restriction element has a desired said restrictive cross section.

3. The pressure differential metering device of claim 2, wherein said variety of sizes and shapes is such that variations include at least one of a different cross-sectional shape and a different cross-sectional contour circumference, said variation being along at least part of a length of said flow restriction element body.

4. The pressure differential metering device of claim 1, wherein said flow restriction element is configured with an upstream aperture and a downstream aperture.

5. The pressure differential metering device of claim 4, wherein said flow restriction element is held in place by an upstream end-port element and a downstream end-port element that are connected to a wall of said inlet port duct.

6. The pressure differential metering device of claim 5, wherein said upstream aperture is a beginning of a passageway that passes through at least a portion of said flow restriction element and said upstream end-port element, and said downstream aperture is a beginning of a passageway that passes through at least a portion of said flow restriction element and said downstream end-port element.

7. The pressure differential metering device of claim 6, wherein said upstream end-port and said downstream end-port provide connection arrangements to a valve control system.

8. A method of creating and monitoring a pressure differential within a pipeline, the method comprising, deploying a flow restriction element within a fluid flow path of the pipeline, such that a central axis of said flow restriction element is perpendicular to a direction of said fluid flow path, said flow restriction element having a restrictive cross section to said flow path, thereby creating a pressure differential, wherein said pressure differential is determined by a configuration of a contour of said restrictive cross section and said contour is a closed curve having a single wall that circumscribes said flow restriction element.

9. The method of claim 8, further including providing a variety of said flow restriction elements in a variety of sizes and shapes.

10. The method of claim 9, wherein said deploying said flow restriction element includes deploying one said flow restriction element having a desired said restrictive cross section to the flow.

11. The method of claim 9, wherein said variety of sizes and shapes is implemented such that variations include at least one of a different cross-sectional shape and a different cross-sectional contour circumference, said variation being implemented along at least part of the length of the flow restriction element body.

12. The method of claim 8, wherein said flow restriction element is implemented having an upstream aperture and a downstream aperture.

13. The method of claim 12, further including holding said flow restriction element in place by end-port elements that are connected to a wall of said pipeline.

14. The method of claim 13, wherein said flow restriction element is implemented such that said upstream aperture is a beginning of a passageway that passes through at least a portion of said flow restriction element and said upstream end-port element, and said downstream aperture is a beginning of a passageway that passes through at least a portion of said flow restriction element and said downstream end-port element.

* * * * *